United States Patent
Budalakoti et al.

(10) Patent No.: US 10,353,900 B2
(45) Date of Patent: Jul. 16, 2019

(54) SYSTEM AND METHOD FOR CREATING AN INTELLIGENT SYNOPSIS OF A DATABASE USING RE-PARTITIONING BASED SAMPLING

(71) Applicant: Oracle International Corporation, Redwood Shores, CA (US)

(72) Inventors: Suratna Budalakoti, Foster City, CA (US); Alan Wood, San Jose, CA (US); Garret Swart, Palo Alto, CA (US); Smriti Ramakrishnan, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 446 days.

(21) Appl. No.: 14/809,004

(22) Filed: Jul. 24, 2015

(65) Prior Publication Data

US 2017/0024452 A1 Jan. 26, 2017

(51) Int. Cl.
*G06F 16/24* (2019.01)
*G06F 16/2455* (2019.01)

(52) U.S. Cl.
CPC .............. *G06F 16/24556* (2019.01)

(58) Field of Classification Search
CPC ......... G06F 17/30864; G06F 17/30486; G06F 17/30412; G06F 17/30442; G06F 17/30477; G06F 17/30554; G06F 17/30536; G06F 16/2462; G06F 16/2468; G06F 16/248; G06F 16/3347; G11B 27/034

See application file for complete search history.

(56) References Cited

U.S. PATENT DOCUMENTS

| | | | |
|---|---|---|---|
| 7,328,221 B2 | 2/2008 | Chaudhuri | |
| 7,636,731 B2 * | 12/2009 | Cruanes | G06F 17/30442 |
| 2003/0084043 A1 * | 5/2003 | Acharya | G06F 17/30489 |
| 2008/0306903 A1 * | 12/2008 | Larson | G06F 17/30536 |

OTHER PUBLICATIONS

Agarwal, Sameer et al., "BlinkDB: Queries with Bounded Errors and Bounded Response Times on Very Large Data", Eurosys' 13 Proceedings of the 8th ACM European Conference on Computer Systems, Apr. 15-17, 2013, Prague, Czech Republic, Copyright © 2013, pp. 29-42.
Chaudhuri, Surajit et al., "Optimized Stratified Sampling for Approximate Query Processing", ACM Transactions on Database Systems (TODS), vol. 32, No. 2, Article 9, Publication Date Jun. 2007, 50 Pages.

* cited by examiner

*Primary Examiner* — Jeff A Burke
*Assistant Examiner* — Cindy Nguyen
(74) *Attorney, Agent, or Firm* — Tucker Ellis LLP (57) ABSTRACT

The present invention provides a re-partitioning-based sampling system and method which provides for generating a synopsis from large database tables such that an aggregation query performed on the synopsis provides an approximate answer to the aggregation query which is in prescribed error bounds relative to a query on the full database. The system includes a partition function generator, a synopsis vector calculator, and a synopsis constructor. The synopsis constructed by the system is sufficiently small to be held in memory to allow quick and resource efficient satisficing of aggregation queries.

18 Claims, 7 Drawing Sheets

FIGURE 1

$$N(A,T) = \sum_{i=1}^{K} |U_i| \cdot E[N(A, s_i)]$$ FIGURE 2a

$$\hat{N}(A,T) = \sum_{i=1}^{K} |U_i| \cdot \hat{E}[N(A, s_i)]$$ FIGURE 2b

$$MSE(A,T) = E[(\hat{N}(A,T) - N(A,T))^2]$$ FIGURE 2c

$$N(A,T) = \sum_{i=1}^{K} |U_i| \cdot E[N(A, s_i)]$$ FIGURE 2d

$$\hat{N}(A,T) = \sum_{i=1}^{K} |U_i| \cdot \hat{E}[N(A, s_i)]$$ FIGURE 2e

$$V(\hat{N}(A,T)) = V\left(\sum_{i=1}^{K} |U_i| \cdot \hat{E}[N(A, s_i)]\right)$$ FIGURE 2f

$$= \sum_{i=1}^{K} (|U_i|)^2 V\left(\hat{E}[N(A, s_i)]\right)$$ FIGURE 2g

$$V(\hat{E}[N(A, s_i)]) = \frac{V(N(A, s_i))}{b_i}$$ FIGURE 2h

$$V(\hat{N}(A,T)) = \sum_{i=1}^{K} \frac{1}{b_i}(|U_i|)^2 V(N(A,s_i))$$ FIGURE 2i

$$V(\hat{N}(A,T)) = \frac{(|U_1|)^2 V(N(A,s_1))}{b}$$ FIGURE 2j

$$b \geq \frac{(|U_1|)^2 V(N(A,s_1))}{t}$$ FIGURE 2k

$$S_A = \rho_1 \cdot b = \rho_1 \cdot \frac{(|U_1|)^2 V(N(A,s_1))}{t}$$ FIGURE 2L

$$V(\hat{N}(A,T)) = \sum_{i=1}^{K} \frac{1}{b_i}(|U_i|)^2 V(N(A,s_i))$$ FIGURE 2m

$$\frac{\sum_{j=1}^{|Q|} V(\hat{N}(q_j, T))}{|Q|} \leq t$$ FIGURE 2n

$$V(\hat{N}(Q,T)) \leq t$$ FIGURE 2o

$$V(Q, s_i) = \sum_{j=1}^{|Q|} \frac{V(N(q_j, s_i))}{|Q|}$$ FIGURE 2p

$$V(\hat{N}(Q,T)) = \sum_{i=1}^{K} \frac{1}{b_i}(|U_i|)^2 V(N(Q, s_i))$$ FIGURE 2q

$$\text{minimize } \sum_{i=1}^{K} \rho_i b_i$$
$$\text{subject to } \sum_{i=i}^{K} \frac{(|U_i|)^2 V_i}{b_i} \leq t$$ FIGURE 2r

$$b_i = \frac{1}{t}|U_i|\sqrt{\frac{V_i}{\rho_i}} \left( \sum_{i=1}^{K} |U_i|\sqrt{V_i \rho_i} \right)$$ FIGURE 2s

$$\rho_i b_i = \frac{|U_i|\sqrt{V_i \rho_i}}{t} \left( \sum_{i=1}^{K} |U_i|\sqrt{V_i \rho_i} \right)$$ FIGURE 2t

$$S = \sum_{i=1}^{K} \rho_i b_i = \frac{\left( \sum_{i=1}^{K} |U_i|\sqrt{V_i \rho_i} \right)^2}{t}$$ FIGURE 2u

$$S_{base} = \left(\sum_{i=1}^{K} |U_i| \sqrt{V_i \rho_i}\right)^2$$

FIGURE 2v $$S_{reqd} = \frac{S_{base}}{t}$$

FIGURE 2w $$t_{sat} = \frac{S_{base}}{S_{cap}}$$

FIGURE 2x

FIGURE 2y $$|U^+|\sqrt{(V(A|U^+)\rho_{U^+}} + |U^-|\sqrt{(V(A|U^-)\rho_{U^-}} < |T|\sqrt{(V(A|T)\rho_T}$$

FIGURE 2z $$\beta_{jk} = |U_i(j+)|\sigma(k|U_i(j+))\sqrt{\rho_{j+}} + |U_i(j-)|\sigma(k|U_i(j-))\sqrt{\rho_{j-}}$$

SYSTEM AND METHOD FOR CREATING AN INTELLIGENT SYNOPSIS OF A DATABASE USING RE-PARTITIONING BASED SAMPLING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to data exploration and data mining in large datasets, and is particularly related to systems and methods for generating a database synopsis which can be held and queried in-memory.

BACKGROUND

Aggregation queries are important for data exploration and mining. An aggregation query is one which returns a summarizing value about the set of rows in a database table qualified by the Where clause of the query. Some common summarizing values are Count, Sum, Average, Median, Max, Min, etc. A count query is a particular type of aggregation query queries which returns the number of rows qualified by the Where clause of the query. With very large database tables, only a small portion of it can be held in memory at one time. Executing an aggregation query on an entire database can therefore be resource intensive and time consuming. Thus it is to generate a synopsis of a database that is small enough to be held in memory and can be used to generate approximate answer to a query that is sufficiently accurate for the purpose of the query.

SUMMARY

With very large database tables, only a small portion of it can be held in memory at one time. In order to facilitate running aggregation queries, it is desirable to intelligently sample the database tables to generate a sample or synopsis which is small enough to be held in memory. The sample is selected such that running the query of the synopsis will generate an approximate answer to the aggregation query which is in prescribed error bounds relative to a query on the full database. The present invention provides a reapportioning-based sampling system and method which provides for generating samples from large database tables such that an aggregation query of the sample will generate an approximate answer to the aggregation query which is in prescribed error bounds relative to a query on the full database.

In embodiments, the present invention provides a method for generating a synopsis of a database table, the method including: receiving a first data sample from the database table; receiving a plurality of candidate functions for partitioning the data sample; selecting a selected function from the plurality of candidate functions, wherein partitioning the first data sample with the selected function divides the first data sample partition into two data sample partitions and wherein the selected function is selected such that a variance of the two data sample partitions over the other candidate functions of the plurality of candidate functions is minimized; re-partitioning the data sample with a plurality of selected functions until a stopping condition is met; generating a partition function using the plurality of selected functions; receiving a second data sample from the database table; partitioning the second data sample using the partition function; and generating the synopsis of the database table using the second data sample partitioned with the partition function.

In various embodiments the method further includes one or more of the following steps. Generating the plurality of candidate functions from a history of database queries used to interrogate the database table. Receiving an evaluation query set and determining the stopping condition using the evaluation query set. Writing the synopsis into a memory on a computer system and using the synopsis to provide an approximate response to an aggregation query which is within prescribed error bounds. Using the partition function in combination with a query history to generate a synopsis vector; and generating the synopsis of the database table using the second data sample partitioned with the partition function in combination with the synopsis vector. Constructing the synopsis by reading a random block from the database table, partitioning the random block into a plurality of pseudo-blocks using the partition function, selecting randomly a selected pseudo-block of the plurality of pseudo-blocks and adding the selected pseudo-block to the synopsis if required by the synopsis vector. Discarding other pseudo-blocks of the plurality of pseudo-blocks if the selected pseudo-block is added to the synopsis. Selecting a different selected pseudo-blocks of the plurality of pseudo-blocks if the selected pseudo-block is not required by the synopsis vector. Repeating the reading, partitioning, selecting, and adding steps until said synopsis vector is satisfied and said synopsis is complete. Storing the synopsis in memory of a computer system; and using the computer system to execute one or more aggregation query on the synopsis.

In embodiments the present invention provides a computer system comprising: a microprocessor and a memory; a partition function generator configured to generate a partition function by receiving a first data sample from a database table and a plurality of candidate functions, selecting a selected function from the plurality of candidate functions such that partitioning the first data sample with the selected function divides the first data sample partition into two data sample partitions having a lowest variance over the other candidate functions of the plurality of candidate functions, and recursively select a plurality of selected functions until a stopping condition is met; a synopsis vector calculator configured to receive a second data sample from the database table and calculate a synopsis vector using the partition function generated by the partition function generator, a predicate query set and an error bound; and a synopsis constructor which samples data from the database table, partitions said data according to the partition function generated by the partition function generator and stores synopsis data in a synopsis in said memory according to said synopsis vector.

In various embodiments the computer system also includes one or more of the following elements. A plurality of candidate functions which comprise a history of database queries used to interrogate the database table. A partition function generator is configured to receive an evaluation query set and use the evaluation query set to determine when to stop recursively selecting candidate functions for said partition function. A query system configured to receive aggregation queries, perform said aggregation queries on said synopsis and generate approximate answers to said aggregation queries within said error bound. A synopsis constructor configured to: read a random block from the database table; partition the random block into a plurality of pseudo-blocks using the partition function; select randomly a selected pseudo-block of the plurality of pseudo-blocks; and add the selected pseudo-block to the synopsis if required by the synopsis vector. A synopsis constructor further configured to discard other pseudo-blocks of the plurality of pseudo-blocks if the selected pseudo-block is added to the synopsis. A synopsis constructor further configured to select a different selected pseudo-blocks of the plurality of pseudo-blocks if the selected pseudo-block is not required by the synopsis vector. A synopsis constructor further configured to repeat the reading, partitioning, selecting, and adding steps until said synopsis vector is satisfied and said synopsis is complete.

In embodiments the present invention also provides a non-transitory computer readable medium having instructions stored thereon which instructions when executed configure a computer system to have the elements of the computer system described above and/or execute the method described above.

In embodiments, the present invention also provides an in-memory synopsis of databases wherein the data for the synopsis is selected according the methods described herein and/or created using the system described herein and is capable of providing, in response to queries, an approximate answer within prescribed error bounds compared to the answer which would be generated by querying the entire database.

Other objects, advantages and embodiments of the present invention will become apparent to those skilled in the art from the following detailed description when read in light of the accompanying drawings.

DETAILED DESCRIPTION

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention. It will be apparent to those skilled in the art that the present invention has application to other types of distributed transaction environment without limitation.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the figures in which the element first appears.

With very large database tables, only a small portion of it can be held in memory at one time. In order to facilitate running aggregation queries it is desirable to intelligently sample the database table to generate a sample portion which is small enough to be held in memory. The sample is selected such that running the query on the sample will generate an approximate answer to the aggregation query which is in prescribed error bounds relative to a query on the full database. This process of arriving at query result that is good enough, by being within some prescribed error bounds, is referred to herein as query satisficing.

Embodiments of the present invention provide a reapportioning-based sampling system and method which provides for generating a synopsis from large database tables such that an aggregation query of the synopsis will generate an approximate answer to the aggregation query which is in prescribed error bounds relative to a query on the full database. The synopsis is customized to a particular query workload. Given an aggregation query, the synopsis provides a numerical answer to the query, along with an error bound around this answer. The synopsis is particularly effective in situations where the database tables are too large to be processed in full, or are being streamed, so that the synopsis creation process has to rely on a random sample.

The synopsis creation method has two main steps: first generating a partitioning/stratification function and second construction of a stratified sample. To generate a partitioning stratification function, a sample is taken from the database table and is used to generate a partitioning function for the table. The goal of the function is to be able to take as input any row from the database, and output a unique partition identification. The function is learned from a sample drawn from the database table, and tries to assign the same partition identification to rows that have similar patterns of response to the query workload. For stratified sample construction, a random sample of blocks of the database table are read into memory and each row in each block is assigned to a stratum/partition using the partitioning function generated in the first step. The sample is stratified according to the partition identification of the rows. After assignment, rows assigned to the more desirable strata are stored in memory as part of the synopsis, while rows from less desirable strata are discarded. The desirability of each stratum is formulated as an optimization problem involving the workload and sample characteristics.

A stratified sample is a non-uniform sample that contains sufficient occurrences of lower frequency attribute values, so that queries about them can be answered. In database terminology, this means ensuring that the low frequency tuples of a database relation (or table) are represented, along with the high frequency ones (for example, in a retail transactions database, all combinations of retail item type and zip codes should be represented, not just the frequent combinations). Each such homogeneous group of rows with the same attribute value combination is referred to as a stratum.

Stratified sampling is often challenging for large databases, as the number of such combinations increases exponentially with the number of columns (curse of dimensionality). This invention takes workload patterns into account by constructing the stratification function over a predicate set of queries. The predicate set includes workload queries along with predicates parsed from these queries, combined with functions generated from database schema and metadata information In combination these predicates provide a representation of the query workload, along with characteristics of the dataset. The stratification is then done over this predicate set.

Row level sampling is prohibitively expensive for large database tables. The common alternative is to sample a block of rows at a time. However, rows sampled in the same block can be correlated with each other, and do not meet the statistical independence guarantees required for statistical error analysis. The stratification function generation algorithm takes a sample of the data table, analyzes its response to a predicate set of queries, and generates a stratification function (or partition function) which is general enough to stratify appropriately any data from the table it sees in the future. This enables a virtual stratification of the table without having to process all its rows, which would be expensive or not even feasible for streaming data. An advantage of the virtual stratification is that it enables query driven stratified sampling for large datasets. Another advantage is the creation of a database synopsis that can provide statistically valid error estimates, despite the presence of statistical dependencies induced by block sampling.

Prior stratified sampling techniques are is ineffective for unstructured data (e.g., text) because the techniques rely on sampling row attribute values based on their relative frequency. For text data/unstructured data, each row of the table is often unique. This invention presents a method for stratified sampling applicable to unstructured data, by modeling text attributes in terms of their response to a predicate set.

General Discussion and Definitions

Given a history $Q_H \subset Q_S$ of aggregation queries that have been run on the database table 100 in the past, where $Q_S$ is the sample space of all syntactically possible aggregation queries on the table. It is assumed that there is an unknown probability function $P_Q$ assigning a probability to each outcome in $Q_S$. It is desirable that the in-memory biased sample, or synopsis 132, to be able to answer queries drawn from $P_Q$ quickly and within some prescribed error bounds. More precisely, if the answer is approximated for a randomly drawn aggregation query from $P_Q$: $Q_S \to [0, 1]$ using our synopsis 132, it is desirable that the expected value of the mean squared error around this approximation to be below some prescribed error bound. This process of arriving at an answer that is good enough for our purposes, by being within some prescribed error bounds, is referred to here as query satisficing.

Of course, a query can be answered by a sufficiently large unbiased synopsis that simply samples randomly from the table until the memory is full. However sampling intelligently can significantly reduce the synopsis size required to meet a given error bound, or for a synopsis of given size, the error bound achieved via this approach can be much smaller than one achieved by random sampling.

For example if an aggregation count query A needs to be run over database table 100, which is divided into $U_1 \ldots U_K$, $K \geq 1$, partitions of different sizes. Count query A can be viewed as the query how many rows exist in database table T where the following query parameters are true for the row. An example, in a sale transactions database would be how many blue dresses have been sold in the Cleveland store? Query A can be viewed as an indicator function with the rows in T as its domain. A: $T \to \{0, 1\}$ returns 1 for $r \in T$ if r matches A (its Where clause), and 0 if it does not. Thus the goal is to estimate the number of rows in T that return 1 for function A.

Because it is resource intensive and time-consuming to read the entire database table 100 and evaluate Query A in all rows of database table 100, it is desirable to use sampling to arrive at an estimate of N (A, T), the number of rows in T that match A. Due to I/O constraints, the data from disks can only be sampled in blocks of rows of some constant size. One sampling approach is to sample blocks from each partition $U_i$ to arrive at an estimate of $E[N (A, s_i)]$, the expected number of rows that match A for a randomly chosen block $s_i$ from partition $U_i$. Then the estimate of $E[N (A, s_i)]$ by $|U_i|$, is multiplied by the number of blocks in partition $U_i$, to estimate the number of rows that match A in the partition $U_i$. Summing this value across all partitions gives an estimate of N (A, T).

The higher the variance of N (A, $s_i$), the greater the number of samples required to arrive at an accurate estimate of its expected value, $E[N (A, s_i)]$. The best case for a query A is when the variance of N (A, $s_i$) is low for all partitions, or at least the larger ones. The per block variance N (A, $s_i$), for a partition $U_i$, can be small in two ways. Either a large number of rows match query A per block in partition $U_i$, but the number of rows that match remains relatively constant. Alternatively, the number of rows matching A is 0 for most blocks in partition $U_i$, even if the variance is high for the small subset of blocks in partition $U_i$ where matches for query A are found.

The best case outcome is where every query matches exactly the same number of rows (including 0) per block for a given partition. In that case, it would only be necessary to save exactly one block per partition to create a synopsis. However, such a result is very unlikely in a real database with real queries. However, to facilitate synopsis creation, a new virtual partitioning of database table 100 can be constructed, so that for all of the newly constructed partitions, the per block variance in rows matching query A is small, for a random query A from $P_S$. This process is referred to here as re-partitioning, and the newly constructed partitions are referred to as pseudo-partitions.

If the re-partitioning is sufficiently effective, a biased sample can be created that satisfies most queries and is small enough to be held in memory 130. This is more likely to be the case if the rows in memory are reusable across queries, so such a sample would have to represent some sort of consensus on what rows most queries from $P_Q$ are likely to find useful. Such a sample of rows held in memory may be referred to as a synopsis.

The process of deciding how much data to store from each pseudo-partition as part of the biased sample is called the synopsis vector calculation step. This step provides a synopsis vector, the i-th element of which describes how much data to hold from the i-th pseudo-partition in memory.

A synopsis vector over a table T with K partitions is defined as a weight vector $B = (b_1, \ldots, b_K)$, where $b_i$ represents the number of randomly sampled blocks from partition i to be stored in memory. The expected size $S_B$ of a synopsis vector is the expected number of rows such a synopsis would consist of in memory. Assuming a block in partition i has $\rho_i$ rows on average, $S_B = \sum_{i=1}^{K} \rho_i b_i$. A synopsis is a realization of a synopsis vector B, consisting of actual rows from database table 100, which contains $b_i$ randomly selected blocks from partition $U_i$.

TABLE 1

Index of Symbols Used in the Specification and their Meanings

| Symbol | Description |
| --- | --- |
| A | Query sampled from $P_Q$ or $Q_H$ |
| B | Synopsis Vector |
| $b_i$ | i-th element of synopsis vector B |
| $B_O$ | Synopsis Vector |
| $E[N(A, s_i)]$ | Expected no. of rows for which A is true, for a random block in $U_i$ |
| $F_{cand}$ | The set of candidate indicator functions |
| $F_{Part}$ | Partition function |
| N (A, T) | No. of rows in table T, for which A is true |
| $P_Q$ | Unknown Query Distribution |
| $Q_S$ | Set of Syntactically Possible Queries |
| $Q_H$ | Query History |
| $Q^-_{val}, Q^-_{rep}$ | Query samples |
| $\rho_i$ | Mean size of a block from partition i |
| $S_B$ | Expected Size of a synopsis vector B in no. of rows |
| $S_{base}$ | The base synopsis size (synopsis size for t = 1) |
| T | Table |
| $T^-_1, T^-_2$ | A sample set of blocks from table T |
| t | Mean Squared Error threshold |
| $U_i$ | Partition i of a table |
| $|U_i|$ | No. of Blocks in Partition i of a table |
| V(X) | Variance of a random variable X |
| $V_i$ | Mean Variance of a set of queries for partition $U_i$ |

Given a query distribution $P_Q$ and an error threshold $t \in R^+$, a synopsis vector $B_o$ over a table T is defined as the synopsis vector with the smallest expected size, such that the expected value of the mean squared error (MSE) on a randomly drawn query $A \in P_Q$ is less than the error threshold. If the block size varies from block to block the desired synopsis vector is defined as the vector with the smallest expected size.

Figure 2A:
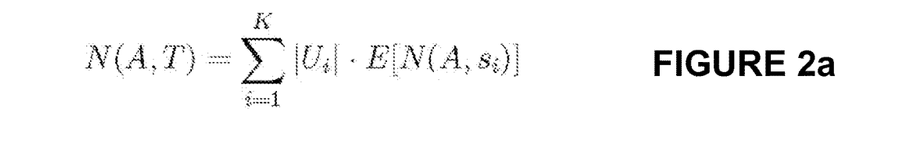
FIGS. 2a to 2z provide equations which illustrate the operation of a system and method for generating an intelligent synopsis according to an embodiment of the invention.
Figure 2B:
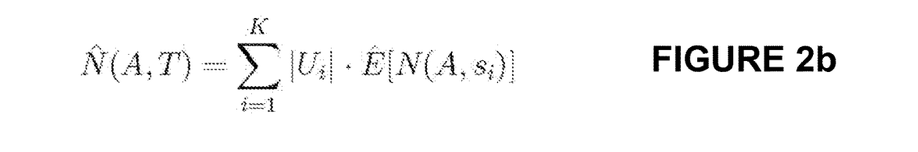
Figure 2C:
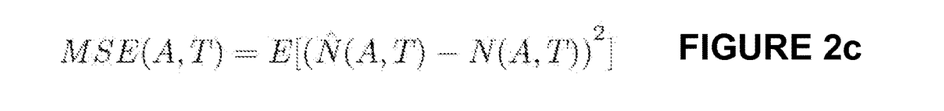

The mean squared error for a single query A is calculated as follows: as discussed above, the number of rows that match a query A in a partition $U_i$ is the product of the expected number of matches per block $E[N(A, s_i)]$, and the number of blocks $|U_i|$ in the partition. Thus the total number of rows that match A in table T is given by the equation of FIG. 2a. Given a synopsis, an estimate of $E[N(A, s_i)]$, written as $E^-[N(A, s_i)]$, can be derived from each partition, and used to estimate N (A, T) as illustrated by the equation of FIG. 2b. Thus the mean squared error of an estimate of A is given by the equation of FIG. 2c.

Figure 1:
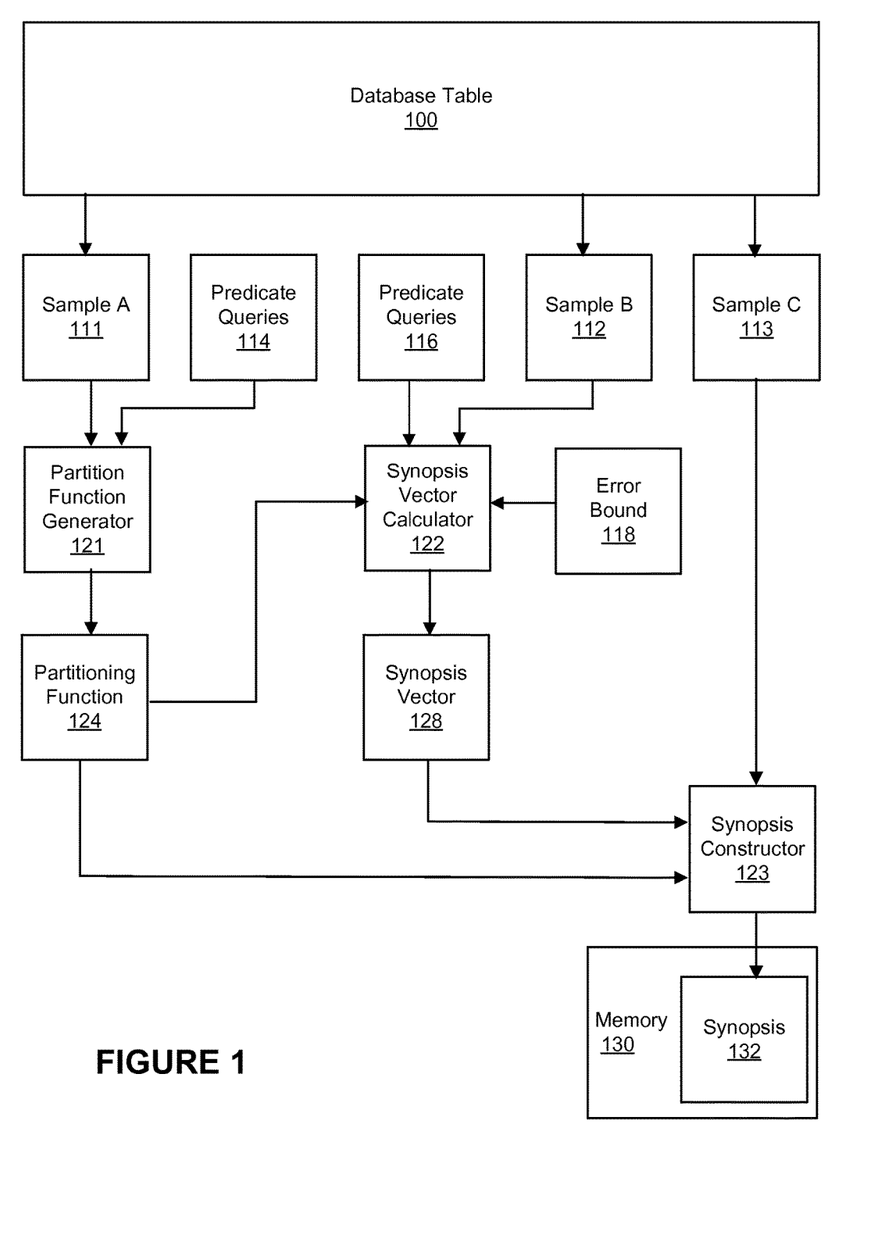
FIG. 1 shows a block diagram of a system and method for generating an intelligent synopsis according to an embodiment of the invention.

FIG. 1 shows a block diagram of a computer system 150 for generating an intelligent synopsis according to an embodiment of the invention. The computer system includes one or more microprocessor 152 and a memory 130. A query system 152 provides an interface for receiving aggregation queries, running the aggregation queries on the synopsis 132 and providing answers to the aggregation queries. The system for building a synopsis 132 for a database table 100 in memory, based on some query history $Q_H$, consists of three elements which operate sequentially: a partition function generator 121; a synopsis vector calculator 122; and a synopsis constructor 123 which are described in more detail below.

FIG. 1 shows a database table 100 which is too large to fit in memory. A data sample A 111 is taken from the database table 100 and used in combination with a set or predicate queries 114 as input to a partition function generator 121. Partition function generator 121 generates a partitioning function 124 for the database table 100. Partitioning function 124 can take as input any row from the database table 100, and outputs a unique partition ID. The partitioning function 124 is learnt from the sample A 111 drawn from the database table 100 by partition function generator 121 which tries to assign the same partition ID to rows from the database table 100 that have similar patterns of response to the predicate queries 114.

Synopsis vector calculator 122 determines synopsis vector 128 using a fresh sample B 112 and a sample of representative queries 116 that the synopsis is built on. Synopsis vector calculator also requires the re-partitioning function 124 generated by partition function generator 121 and the error bound 118 in the form of a desired expected value of the mean squared error (MSE) for a randomly drawn query. Synopsis vector 128 is provided with partition function 124 to synopsis constructor 123.

Referring again to FIG. 1, after partition function generator 121 has generated partitioning function 124, and synopsis vector calculator 122 has generated synopsis vector 128, the synopsis constructor 123 uses the partitioning function 124 to partition Sample C 113 taken from database table 100. A random sample C 113 of blocks of the database table 100 are read into memory and each row in each block is assigned to a stratum/partition using the partitioning function 124. After assignment to a partition, rows assigned to the more desirable strata/partition are stored in memory 130 as part of the synopsis 132, while rows from less desirable strata are discarded until the synopsis has been filled in accordance with the synopsis vector 128. Essentially, the synopsis vectors dictates how many rows of each partition/strata are required and the synopsis constructor keeps sampling and partitioning until each stratum is full. It may take longer to fill some strata than others—once a stratum is full, any additional rows having the partition ID associated with the stratum are discarded.

The synopsis 132 has been created when all the strata have been filled with sampled rows from database table 100 in accordance with synopsis vector 128. A subsequent aggregation query can then be efficiently executed against the synopsis 132 in memory 130 and generate a query result which is within a prescribed error bound.

The Partition Function Generator

Partition Function Generator 121 ($T_1$, $F_{cand}$, Qval)→$F_{Part}$ is a module that generates a partitioning function $F_{Part}$. The function $F_{Part}$ takes an input a row from database table 100, and assigns it a pseudo-partition ID. Applying $F_{Part}$ to each row of the table re-partitions the entire table. However, typically only a sample of the table is re-partitioned on an as-needed basis to save time. The goal of the partition function generator 121 is to produce a partitioning function $F_{Part}$ that will, loosely speaking, create pseudo-partitions well-aligned with the query distribution $P_Q$. In theory, $F_{Part}$ can take any form. The conditions are: a) the function is deterministic, and b) if rows assigned the same partition-ID are grouped together, the resulting sets are mutually exclusive, and collectively exhaustive with respect to database table 100. That is, $F_{Part}$ should assign exactly one partition ID to each row, and never fail to assign a partition ID to any row in database table 100.

The partition function generator 121 takes as input:
1. $T_1$: A sample set of blocks from T.
2. $F_{cand}$: A set of candidate indicator functions, each of which can map a row from T to a binary output ($F_{cand} = \{f_1, \ldots f_m\}$, $f_i:T \to \{0, 1\}$). For example, each $f_i$ could consist of the Where clause of a query run on T in the past, or could be equality or range predicates drawn from the database schema.

3. $Q_{val}$: A set of validation queries, sampled from the query history $Q_H$, which the generated partition function can be evaluated on, to guide the function generation process.

The candidate function set $F_{cand}$ and the query validation set $Q_{val}$ are quite similar in appearance: both consist of indicator functions and are likely to be Where clauses of queries, or derived from them. However, their roles are quite different. $F_{cand}$ is used to transform rows in T to a new feature space. The representation for $r \in T$ in this feature space will look like a binary (bit) vector, with the i-th element indicating whether $f_i(r)=1$ or $f_i(r)=0$. The partition function generator attempts to infer a function $F_{Part}$ built over this feature space, which re-partitions the data well for future queries. $F_{cand}$, if chosen carefully, reflects common properties of queries expected in the future. For example, if $F_{cand}$ consists of queries commonly seen in the past, the re-partitioning will be tailored to these queries. Or if $F_{cand}$ consists of queries made on a subset of columns, the re-partitioning will be well-suited to queries on these columns. On the other hand, $Q_{val}$ plays the role of the validation set, used to evaluate the quality $F_{part}$, to guide Operation of the Partition Function Generator 121.

The re-partitioning function $F_{Part}$ 121 output by partition function generator 121 is essentially a decision tree, each path of which leads to a unique partition ID. Each node of the tree is a function chosen from $F_{cand}$. In other words, each pseudo-partition is defined by a conjunction of indicator functions (or their complements) selected from $F_{cand}$.

The Synopsis Vector Calculator

The synopsis vector calculator 122 $(T_2, Q_{rep}, F_{Part}, t) \rightarrow B_o$ generates a synopsis vector 128 $B_o$, which identifies the number of pseudo-blocks to read from each pseudo-partition generated by the Partition Function Generator 121. A pseudo-block is defined as the set of rows within a single block that are assigned to the same pseudo-partition. Since data is sampled at the block level, and also because it is difficult to guarantee that the data sampled is independent and identically distributed except at a very local level, the synopsis vector calculator samples pseudo-partitions at the pseudo-block level.

The synopsis vector 128 returned by the synopsis vector calculator 122 preferably has the smallest value that generates results within the desired error bounds given the input parameters (discussed below). The preferred synopsis 132, as defined earlier, is the one with the smallest value of the expected number of rows. Since pseudo-block sizes vary from block to block based on the re-partitioning, the exact size of a synopsis 132 can be known only once it has been constructed based on a synopsis vector 128. That is why only an expected size of a synopsis vector 128 can be calculated.

The input parameters of the Synopsis Vector Calculator are:
1. $T_2$: A sample set of blocks from table T. This is a fresh sample, different from $T_1$ used for generating the partition function. Two separate samples are used to reduce the risk of over-fitting. It is possible that certain pseudo-partitions defined by Partition Function Generator 121 are artifacts of the sample read in. These pseudo-partitions are unlikely to re-appear in $T_2$, and so shall automatically be ignored.
2. $Q_{rep}$: A sample of representative queries, which the synopsis is built on. $Q_{rep}$ should reflect the type of queries the synopsis is expected to encounter in the future. For example, this could be a sample from $Q_H$.
3. $F_{Part}$: The re-partitioning function generated by Partition Function Generator 121.

4. t: The desired expected value of the mean squared error (MSE) for a randomly drawn query from $Q_{rep}$.

If the query probability distribution $P_Q$ is fully known, it is possible to calculate the value of $B_o$. However, in practice, $P_Q$ is not known, and the query history $Q_H$ is too large to be used for $Q_{rep}$ in its entirety. Thus a random sample is taken from $Q_H$, and treated as a reasonable representation of $P_Q$ for the purpose of calculating $B_o$. This works for sufficiently homogeneous queries. However, in alternative embodiments where the synopsis will be used with more heterogeneous queries it is desirable to utilize alternative approaches using a more sophisticated representation of $Q_{rep}$. For example, a more sophisticated representation of $Q_{rep}$ can be created by a detailed analysis of the query logs $Q_H$, or b) using a fast backup store, on for example, flash memory, of intelligently chosen additional synopsis data that can be read and loaded into main memory if required to satisfice unusual queries.

The Synopsis Construction Module

The Synopsis Constructor $(B,T,F_{part})$ reads in a synopsis vector B, and the partitioning function $F_{part}$ calculated by Synopsis Vector Calculator. Then, it repeats the following steps until the synopsis construction in memory is complete.
1. Read in a random block b from table T. Use the re-partitioning function $F_{part}$ to partition the block into pseudo-blocks (in most cases, pseudo-blocks corresponding to only a few pseudo-partitions will be generated).
2. Randomly select a pseudo-block extracted from b in Step 1, and check if the required number of samples corresponding to its pseudo-partition ID are already in memory. If not, store the pseudo-block in memory, and discard all other pseudo-blocks extracted (to avoid introducing unaccounted for correlation errors via dependencies between pseudo-blocks read from the same block). Otherwise, randomly select another extracted pseudo-block, until all extracted pseudo-blocks have been evaluated, or a required one has been found.

The above analysis can be improved via a knapsack-styled analysis, where pseudo-blocks that are relatively rare in the data, but disproportionately required by the synopsis are evaluated first. Additionally, results may be improved by using information gained about partition variances while sampling for synopsis construction, to continuously re-evaluate the synopsis vector.

Figure 3:
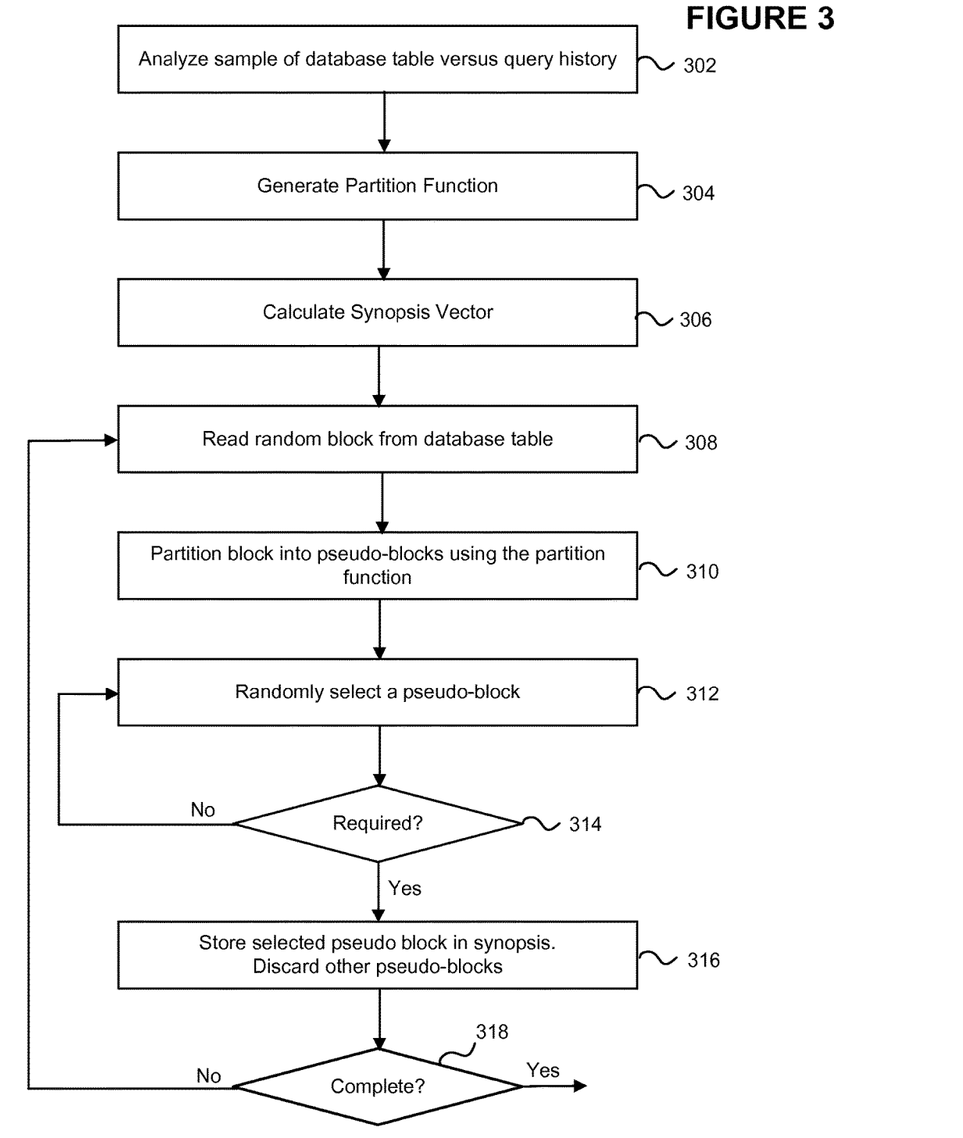
FIG. 3 shows a general overview of a method for creating an intelligent synopsis of a database using re-partitioning based sampling according to an embodiment of the invention.

FIG. 3 shows a general overview of a method for creating an intelligent synopsis of a database using re-partitioning based sampling. As shown in FIG. 3, at step 302, candidate functions derived e.g. from the query history are analyzed against a sample of the database table to identify partition function. At step 304, the partition function is generated. At step 306, the synopsis vectors is calculated using the partition function as input in combination with a different sample of the database table, predicate queries, and an error bound specification.

At step 308, synopsis construction begins by reading a block at random from the database table. At step 310 the partition function is used to re-partition the block from the database table into pseudo-blocks. As step 312 one of the pseudo-blocks is selected at random. At step 314, the selected pseudo-block is evaluated in light of the synopsis vector to determine if more samples corresponding to its pseudo-partition ID are required in the synopsis. If no more samples corresponding to the pseudo-partition ID of the selected pseudo-block are required, another pseudo-block is selected (until a required pseudo-block is found or all pseudo-block have been examined). At step 316, if more samples corresponding to the pseudo-partition ID of the selected pseudo-block are required, the pseudo-block is written to memory as part of the synopsis. All other pseudo-blocks extracted from the randomly selected block are discarded (to avoid introducing unaccounted for correlation errors via dependencies between pseudo-blocks read from the same block). At step 318, if the synopsis vector has been satisfied and no more pseudo-blocks are required, the synopsis is complete. If the synopsis vector has not been satisfied and additional pseudo-blocks are required, the method is repeated from step 308—i.e. another block is randomly selected—until the synopsis is complete.

Calculating the Synopsis Vector

This section discusses the details of the Synopsis Vector Calculator described above. For example, if it is desirable to obtain an approximate answer to a count query A over a partitioned table T with K partitions and it is desired to guarantee that the mean squared error (MSE) around the approximation is within some threshold t. At each time-step, an action can be performed sampling a block from a partition of our choice. In order to satisfy queries expeditiously, is desirable to read as few rows as possible to obtain the approximate answer, while still meeting the guarantee. The blocks being sampled could be original data blocks of fixed size, or pseudo-blocks generated by the repartitioning process. The analysis does not differ between the two cases. The synopsis vector calculator is used to determine how many blocks should be sampled from each partition in order to meet the threshold t while minimizing the number of rows read in the process. This section presents a method to calculate the number of blocks required from each partition, so that the number of rows read in total from the database table are minimized, while keeping the mean squared error (MSE) below the desired threshold.

Mean Squared Error on Count for a Single Query

Figure 2D:
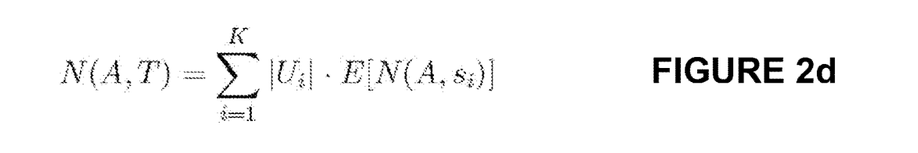
Figure 2E:
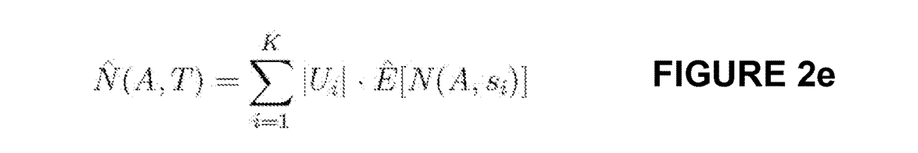
Figure 2F:
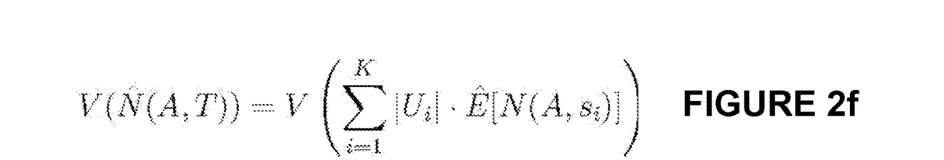
Figure 2G:
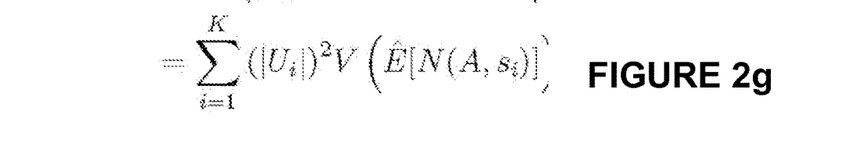

The following illustrates the relationship between the mean squared error (MSE) for a single query and the characteristics of each partition: partition size, variance in number of matches per block for the partition, and the number of samples taken per block. The total number of rows that match A in table T is given by the equation of FIG. 2d. An estimate of N(A; T), written as ^N (A; T), can be derived as shown in the equation of FIG. 2e. From this equation, it can be seen that the variance (or mean square error) around our estimate of N(A; T) from a random sample taken from T, is a weighted sum of the sampling error in the estimation of E[N(A; si)] per partition, the weight depending on the size of the partition as shown in the equations of FIG. 2f and FIG. 2g.

Figure 2H:
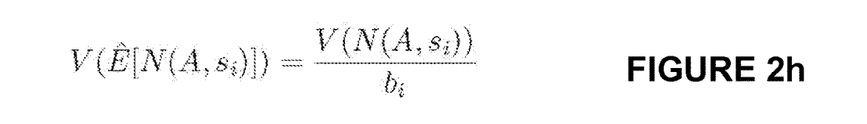
Figure 2I:
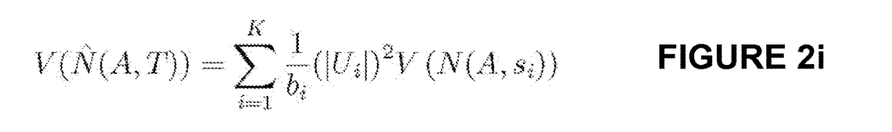
Figure 2J:
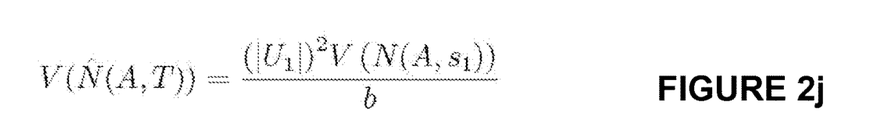
Figure 2K:
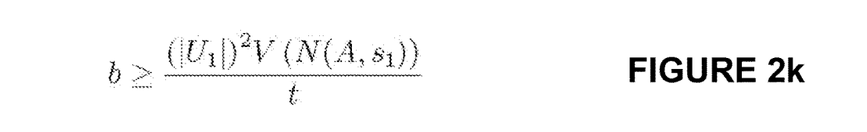
Figure 2L:
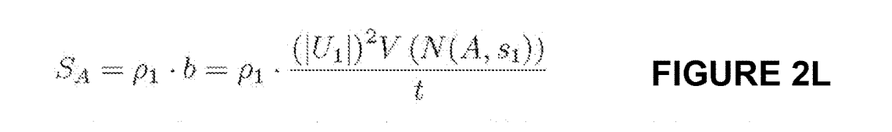

The function V (E^[N (A, $s_i$)]) can be calculated if the per block variance in the number of rows for which A is true V (N (A, $s_i$)), t is known. If $b_i$ blocks have been sampled from partition $U_i$, V (E^[N (A, $s_i$)]) is given by the equation of FIG. 2h. Extending the analysis to N^(A, T) leads to the equation of FIG. 2i. Thus, for example, if T had a single partition $U_1$, the variance around our estimate of V (N (A, T)) after b samples from $U_1$ would be as shown in the equation of FIG. 2j. So, if the variance around our estimate of N (A, T) is desired to be below some threshold t, the minimum value of b is given by the equation of FIG. 2k. Assuming the average size of a block in the partition is $\rho_i$, the expected size of the smallest synopsis that ensures that the MSE of A is below t is given by the equation of FIG. 2L. It can be seen from this equation that the synopsis size varies inversely with the MSE threshold t for a single partition.

Mean Squared Error on Count for Multiple Queries

Figure 2M:
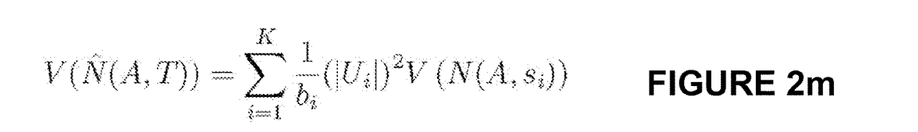
Figure 2N:
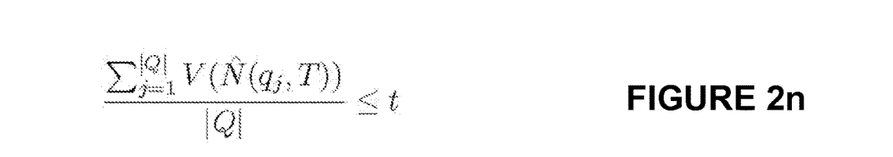
Figure 2O:
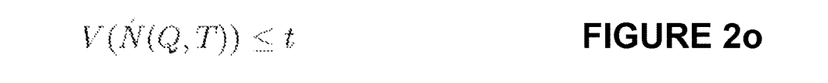

The following illustrates the relationship between the mean squared error (MSE) on count for multiple queries to the characteristics of each partition: partition size, variance in number of matches per block for the partition, and the number of samples taken per block. For a given query A, the equation of FIG. 2i given as the equation of FIG. 2m relates the variance per partition for A to the MSE in its estimation. It is desirable to extend this analysis to multiple queries. One way to do this is to require that for a given set of queries $q_j$ ∈ Q, the average value of estimated MSE is below a certain threshold as illustrated by the equation of FIG. 2n and FIG. 2o.

Figure 2P:
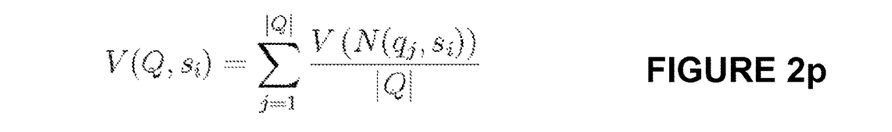
Figure 2Q:
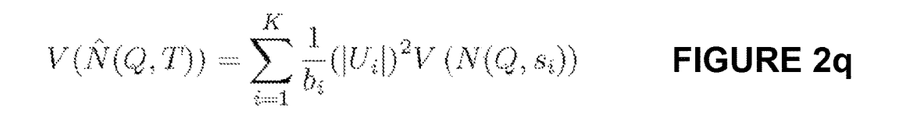

Assuming a single unchanging synopsis in memory, the number of blocks the synopsis has per partition will not change. Let $b_i$ be the number of blocks of partition i that are held by the synopsis in memory. Then, let V (Q, $s_i$) be the mean variance for partition i across all queries. The mean variance for partition i across all queries can thus be calculated from the equation of FIG. 2p. Then with some algebra, a relationship very similar to the equation of FIG. 2m can be established as shown in the equation of FIG. 2q. That is, the mean variance in estimation across all queries in a set Q is a weighted sum of the mean variance per partition of the queries, and the number of blocks sampled from the partition.

Calculating the Synopsis Vector Given Error Threshold

Figure 2R:
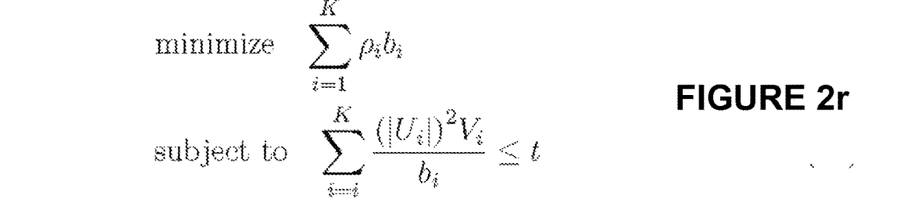
Figure 2S:
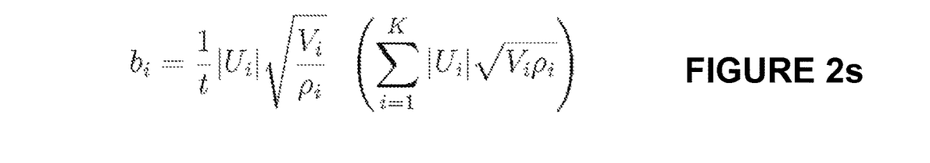
Figure 2T:
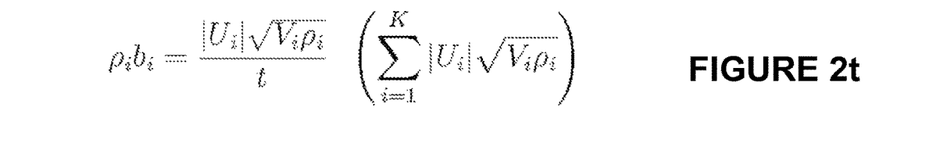
Figure 2U:
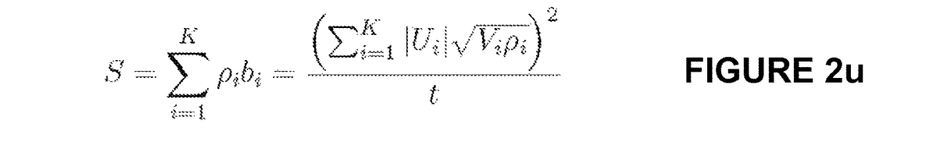

In light of the above illustration of the relationship between the MSE for multiple queries to the characteristics of each partition: partition size, variance in number of matches per block for the partition, and the number of samples taken per block the synopsis vector for multiple queries can be calculated as follows. It is desirable to bring V (N^(Q, T)) below some threshold t. For brevity, this can be written as V (N (Q, $s_i$)) as $V_i$. Also, let the mean number of rows per block for the i-th partition be $\rho_i$ ($\rho_i$ will vary from (pseudo-)block to (pseudo-)block if the data has been re-partitioned). It is desirable to minimize for each partition, the product of the mean number of rows per block and the number of blocks in memory as shown in the equation of FIG. 2r. This can be solved using Lagrange multipliers to yield the solution shorn in the equation of FIG. 2s. Then the number of rows read from partition i is given by the equation of FIG. 2t. Then the synopsis size S, the total number of rows needed to be read into the synopsis will be given by the equation of FIG. 2u.

Figure 2V:
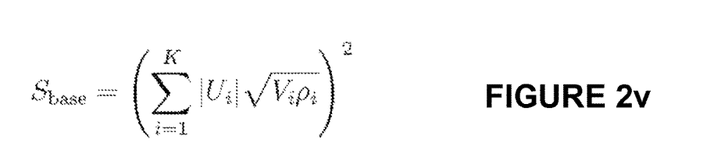
Figure 2W:
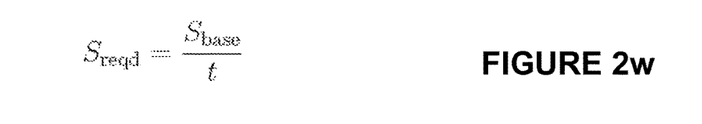
Figure 2X:
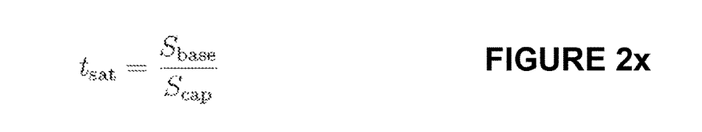

Let $S_{base}$ be represented as shown in the equation of FIG. 2v. Then the synopsis size required to meet any threshold t can be calculated as shown by the equation of FIG. 2w. Similarly, given a synopsis capacity $S_{cap}$ in number of rows, the error threshold that can be satisfied, $t_{sat}$ is given by the equation of FIG. 2x. This suggests that a desirable partitioning function would create a set of K pseudo-partitions that minimizes $S_{base}$ across them. In practice, though, the actual value of the terms involved in calculating $S_{base}$ will not be known, but will be estimated via sampling during all three stages of synopsis construction, the estimates improving over time. As a result, the synopsis vector is unlikely to be absolutely optimal. It will, however, be sufficiently accurate to satisfy the needs of the synopsis constructor.

The Partition Function Generator Algorithm

This section discusses the partition function generator algorithm introduced above. The total number of blocks as well as the expected number of rows required to be read (expected synopsis size), increases inversely with the required error threshold. The expected size of the synopsis is also shown to be an increasing function of the standard deviation in the number of rows that match the query per block, as well as the block size. Thus, it is desirable that re-partitioning should create partitions of small size where the standard deviation in the number of rows that match the query per block is small.

The output of this algorithm is a function $F_{Part}$ that maps any row in T to a pseudo-partition ID, with the goal that the resulting re-partitioning would result in a synopsis with fewer rows than a random sample. The Partition Function Generator 121 $(T_1, F_{cand}, Q_{val}) \rightarrow F_{Part}$ takes as input a set of candidate indicator functions $F_{cand}$ that the final partition function is constructed from, and a set of validation queries $Q_{val}$ to evaluate the current iteration of its partitioning function. In the current implementation, for example, the final partition function is a decision tree build over a subset of the candidate indicator functions. For brevity, from here each element of $F_{cand}$ is referred to as a candidate function or a candidate.

Partition Function Generation Algorithm: Introduction

The partition function is a function for dividing a sample of the database table to create a stratified sample of the database table as discussed above, a stratified sample is a non-uniform sample that contains sufficient occurrences of lower frequency attribute values, so that queries about them can be answered. In database terminology, this means ensuring that the low frequency tuples of a database relation (or table) are represented, along with the high frequency ones (for example, in a retail transactions database, all combinations of retail item type and zip codes should be represented, not just the frequent combinations). Each such homogeneous group of rows with the same attribute value combination is referred to as a stratum. In general terms, the partition function determines what types of rows go in each stratum where the synopsis vector determines how many rows go in each stratum.

Stratified sampling is often challenging for large databases, as the number of such combinations increases exponentially with the number of columns (curse of dimensionality). In embodiments, the partition function generation algorithm of the present invention takes workload patterns into account by constructing the partition function over a predicate set of queries. The predicate set includes workload queries along with predicates parsed from these queries, combined with functions generated from database schema and metadata information In combination, these predicates provide a representation of the query workload, along with characteristics of the dataset. The stratification is then done over this predicate set.

Row level sampling is prohibitively expensive for large database tables and block level sampling might not meet the statistical independence guarantees required for statistical error analysis because of correlation or rows in a block. The partition function generation algorithm takes a sample of the data table, analyzes its response to a predicate set of queries, and generates a stratification function (or partition function) which is general enough to stratify appropriately any data from the table it sees in the future. This enables a virtual stratification of the table without having to process all its rows, which would be expensive or not even feasible for streaming data.

An advantage of the virtual stratification resulting from the partition function generation algorithm is that it enables query driven stratified sampling for large datasets. Another advantage is the creation of a database synopsis that can provide statistically valid error estimates, despite the presence of statistical dependencies induced by block sampling. Another advantage is that it is suitable for partitioning unstructured data, by modeling text attributes in terms of their response to a predicate set.

To generate a partitioning function, candidate functions for partitioning the table/sample into pseudo-partitions are examined. Assuming the table T is split into two pseudo-partitions on a single indicator function $f$. That is, for the first pseudo-partition (say $U^-$), function $f$ is false for all rows, while function $f$ is true for all rows in the other pseudo-partition (say $U^+$). For a query A, this re-partitioning would be beneficial if the total number of rows required from both new pseudo-partitions is less than the number of rows required from the original table.

Figure 2Y:
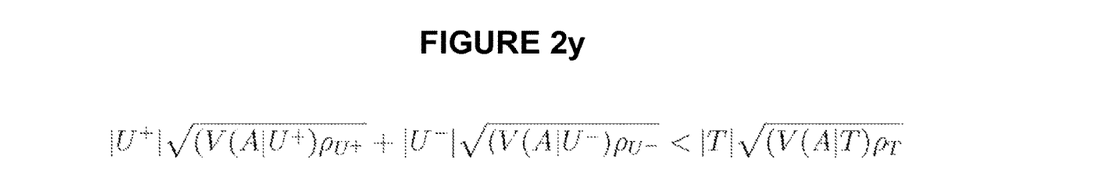

From the expression for $S_{base}$ shown in the equation of FIG. 2v, it can be seen that that this would be the case when the equation of FIG. 2y is satisfied. For example, if function $f$ is the Where clause of a query that is very likely to be seen in the future (the Where clause of a query is an indicator function), creating a pseudo-partition dedicated to function $f$ is likely to ensure that the function $f$ and similar queries can be answered with high accuracy, as the variance per block for function $f$ will be 0. Function $f$ is an even better choice if: a) it is frequently a subset of other Where clauses, b) there is a statistical relationship between f and a significant subset of interesting queries, so that knowing whether function $f$ is true or false, significantly reduces the variance on the answer of other queries. The partition function generator utilizes a greedy algorithm to determine a partition function based on this understanding in a recursive manner as described below.

Choice of Candidate Function Set

A key parameter for the partition generation algorithm is the set of candidate functions the partition function is constructed from. A natural choice for the candidate set is the most common Where clauses among queries in the query probability distribution $P_Q$. In general, $P_Q$ is not known, and the next best option is to use a sample taken from the query history $Q_H$ as the candidate set. The risk with this approach is that if our sample is not sufficiently representative, or if the workload changes significantly, the synopsis may do almost as bad as random, or possibly even worse. To reduce the likelihood of this happening, a more versatile candidate set can be used, for example, by using schema information, or by pre-processing the query sample. Table 2 presents a list of various candidate sets, the type of queries they were evaluated on, and information on their relative performance.

Partition Function Generation Algorithm: Details

Figure 2Z:
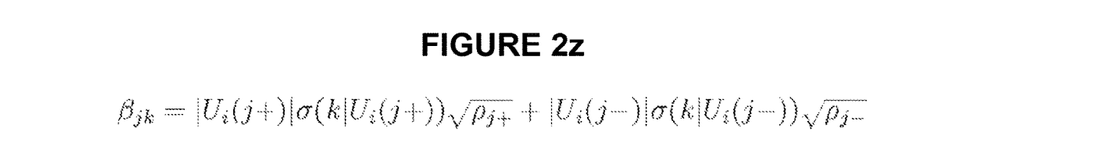

Suppose there is a partition that is to be further divided into two parts. The split will minimize the number of rows needed to satisfy a query A, if the split minimizes the following expression across the two newly created partitions, $U^+$ and $U^-$: $|U^+|\sigma(A|U^+)^\gamma \rho_{U+} + |U^-|\sigma(A|U^-)^\gamma \rho_U$ as shown in the left hand side expression of the equation of FIG. 2y. Here $\sigma(A|U^+)$ is the standard deviation of the number of matches of A per pseudo-block of $U^+$ (similarly for $\sigma(A|U^-)$). Given an initial set of pseudo-partitions $T = U_1 \ldots U_K$ (derived from, say, Principal Component Analysis (PCA)), the following greedy recursively splitting algorithm can be used to re-partition. For each pseudo-partition $U_i$:

Suppose pseudo-partition $U_i$ is repartitioned based on a candidate function $f_j$ in the query set that is true for at least one row within $U_i$. This generates two new pseudo-partitions, written as $U_i(j+)$ and $U_i(j-)$. Then for every other candidate function $f_k$ in the two new possible pseudo-partitions, the expressions shown in the equation of FIG. 2z can be calculated. The number of rows that will be selected from these two new pseudo-partitions to satisfy $f_k$, should it ever occur as the Where clause of a query is approx. $\propto \beta_{jk}^2$. If $\beta_{jk} < |U_i| \sigma(k|U_i)^\gamma \rho_i$ (left hand side<right hand side for the equation of FIG. 2y, then $f_j$ is viable as a splitting function with respect to function $f_k$. Thus the pseudo-partition is split using the partition function that has the smallest mean value for variance $\beta_{jk}$ s over all other functions $f_k$ true at least once within $U_j$. The two new pseudo-partitions are added to U. The candidate function selection and repartitioning process is repeated recursively to repartition the newly created pseudo-partitions until a stopping condition is met as described below.

Figure 4:
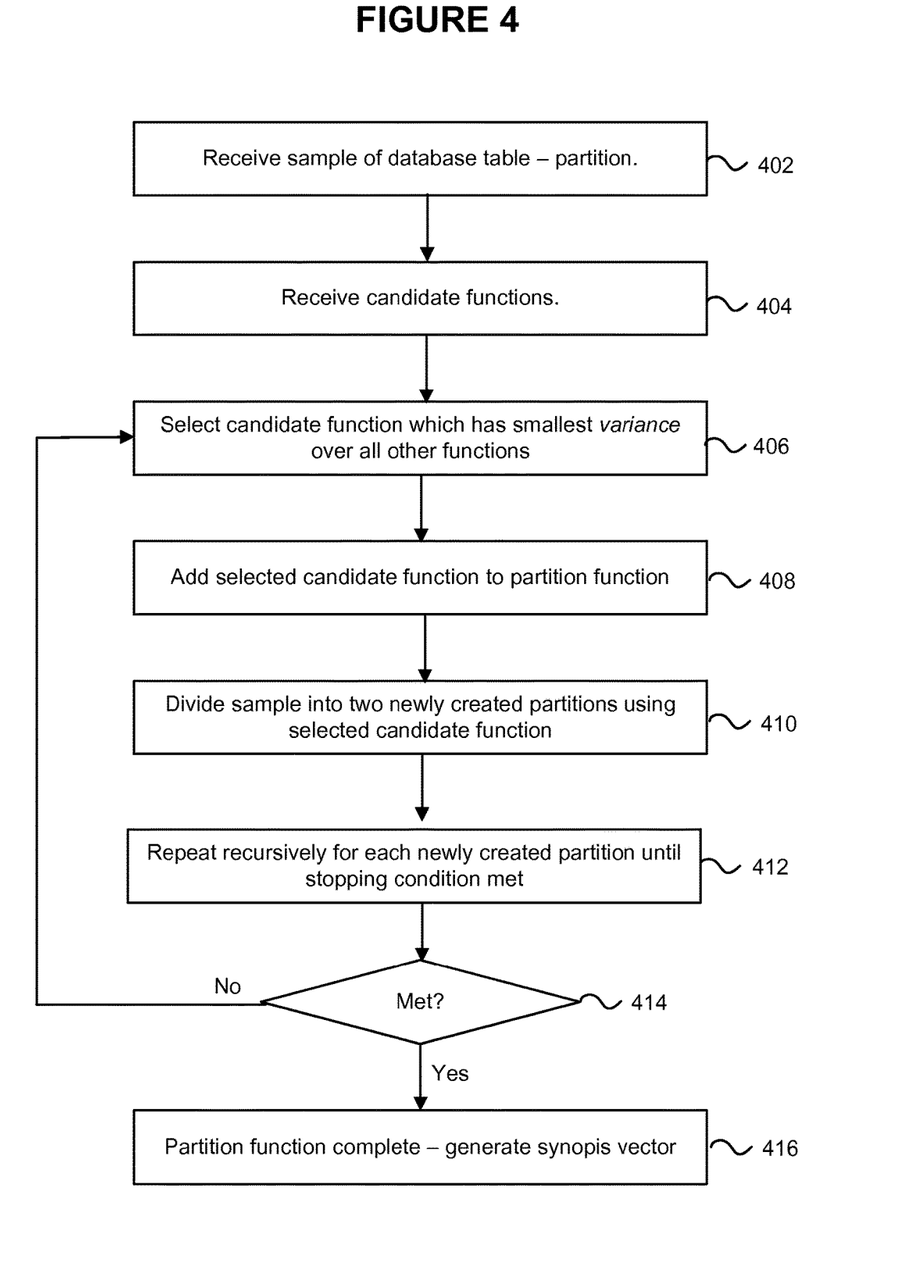
FIG. 4 is a block diagram illustrating a method for generating a partition function for re-partitioning based sampling according to an embodiment of the invention.

FIG. 4 is a block diagram illustrating a method for generating a partition function for re-partitioning based sampling. As shown in FIG. 4, at step 402 a sample of the database table is received and at step 404, a selection of candidate functions are received. At step 406, the candidate function which has smallest variance over all other functions is selected. At step 408, once a candidate function has been selected, that candidate function is added to the partition function. At step 410, the selected candidate function is used to divide the current pseudo-partition into two newly created pseudo-partitions (one in which the candidate function is true, one in which it is false). At step 412, selection of another candidate function and re-partitioning is then repeated recursively for each of the newly created pseudo-partitions until the stopping condition is met. At step 414, if the stopping condition is met, the partition function is complete and can be provided to the synopsis vector calculator at step 416.

Stopping Condition

Looking at the equation of FIG. 2y, it can be seen that the left hand side would be less than the right hand side of the equation in most cases. This is because the terms for |U| and $\rho_U$ on the left hand side are the sum of the terms for |T| and $\rho_T$ terms on the right hand side, and the variance will always fall on the left hand side for at least one term: the indicator function that is being are split on. This seems to bear out empirically, where generally a candidate for splitting can always be found. In practice, this can lead to severe overfitting. For this reason, a validation query set $Q_{val}$ is used for guidance on when to stop re-partitioning.

The stopping condition of the re-partitioning algorithm depends on how stable the synopsis is expected to be. If the synopsis is not expected to change over time, a good stopping condition for the re-partitioning would be where the results, in terms of synopsis size, stop improving on when analyzed using $Q_{val}$. That is, further re-partitioning gives no improvement of results when analyzed with the evaluation queries.

Another possibility is to compare the synopsis vector for the current re-partitioning, with the synopsis vector for a random sampling. That is, re-partitioning is stopped when the synopsis vector's allocation distribution across pseudo-partitions starts looking similar to the distribution of rows across the pseudo-partitions, using a standard distance measure for probability distributions such as the KL-divergence. When this condition is reached, the synopsis calculator is no longer benefiting from the re-partitioning, but is relying on random samples (picking from each pseudo-partition proportional to its size).

Flexible Synopsis

The synopsis vector is cheap to calculate for a query if its variance per pseudo-partition is known. This fact could be used to create a more flexible synopsis, which uses the main memory to hold a large part of the synopsis, but can access required pseudo-blocks from a flash memory backup if required.

As an example, suppose the system is provided with a query, and is able to provide a certain MSE bound t based on the in-memory synopsis. However, based on the per pseudo-partition variance estimates it made on the in-memory data, it may be able to calculate that a certain number of pseudo-blocks from a given pseudo-partition $U_j$ (or more than one pseudo-partition) could improve the error bound significantly. If the required number of pseudo-blocks from $U_j$ are available via flash random access, it may be able to quickly read in these pseudo-blocks, and provide a much better error bound for the query without a significant increase in running time.

The flexible synopsis approach would require keeping a certain number of pseudo-blocks from each pseudo-partition on flash as backup, but provides added flexibility to deal with unusual and/or rare queries or query types. However, if the query distribution changes significantly, the synopsis vector can be difficult to satisfy, irrespective of the composition of the synopsis. In which case, it might be necessary to re-partition the data based on updated information about the query distribution.

Example Results

The predicate set used to generate the partition function can be selected from, for example, query workload/history, schema information, and/or other relevant metadata. The following table describes results of experiments using various candidate query set examples to generate partition functions including conjunctive normal form (CNF) queries, and atomic predicates (Preds.). Overall, a candidate set with a mixture of sampled queries, and the parsed atomic predicates from within these queries seem to do best to date.

TABLE 2

Candidate sets, the type of queries and relative performance.

| Exp. Id | Candidate Set | Query Test Set | Performance |
| --- | --- | --- | --- |
| 1 | Atomic Preds. | Atomic Preds. | Small synopsis size. Performance close to random sample for predicates missing from training set during test. |
| 2 | CNF Queries (2 Atomic Preds.) | CNF Queries (2 Atomic Preds.) | Larger synopsis than Exp. 3-5. Problems with unseen queries, esp. queries with all unseen preds. |
| 3 | CNF Queries (2 Atomic Preds.) and Schema Preds. | CNF Queries (2 Atomic Preds.) | Smaller synopsis than Exp. 2. Less sensitive to unseen queries. |
| 4 | CNF Queries (2 Atomic Preds.) and Atomic Preds. Parsed from Training Set | CNF Queries (2 Atomic Preds.) | Smallest synopsis at present. Less sensitive to unseen queries. |

TABLE 2-continued

Candidate sets, the type of queries and relative performance.

| Exp. Id | Candidate Set | Query Test Set | Performance |
|---|---|---|---|
| 5 | Atomic Preds. Parsed from Training Set | CNF Queries (2 Atomic Preds.) | 10% larger synopsis than Exp. 4. Less sensitive to unseen queries. |
| 6 | CNF Queries (3 Atomic Preds.) | CNF Queries (3 Atomic Preds.) | Relatively large synopsis. Easy to overfit due to longer queries. |
| 7 | CNF terms of length 2 or less Mined from Training Set | CNF Queries (3 Atomic Preds.) | Smaller synopsis than Exp. 6. Less sensitive to unseen queries. |

The system and method for generating an intelligent synopsis of a database using re-partitioning based sampling has been evaluated on the three datasets shown in the table below. The first dataset was an internal banking dataset, where the functional dependencies in the data made it easy to partition and create a very efficient synopsis. The second dataset was from the 1991 US census. The third dataset represented streaming, unstructured data. The intelligent synopsis was created by interaction with an automated query generator based on word association analysis. In addition to providing much smaller confidence intervals than random sampling, the synopsis was able to identify interesting users, so it can be used as a real-time filter to separate interesting and non-interesting tweets (transactions) based on the person tweeting. This is a particularly interesting use case, as traditional stratified sampling are usually ineffective on unstructured data, because relative frequencies are not meaningful for textual data (as each attribute value is usually unique).

| Dataset | Data type | Memory requirement vs. random sample for same accuracy | Confidence Intervals for same size sample |
|---|---|---|---|
| Internal Banking data | Non-transaction, structured data | 1% (100x gain) | 10x smaller than random |
| US Census data (3 million rows) | Non-transaction, structured data | 14% (7x gain) | 2.7x smaller than random |
| Twitter data | Transaction (tweet), unstructured data | 10-15% (7-10x gain) | 2.6-3.2x smaller than random |

The above results demonstrate that the system and method for generating an intelligent synopsis of a database using re-partitioning based sampling generates improved results as compared to prior sampling techniques. For a particular size of synopsis the synopsis generated by the system and method disclosed herein is capable of generating much more accuracy i.e. smaller confidence intervals, for example, between two and ten times smaller confidence intervals. Thus, for example, where it is desirable that the synopsis be held in memory of a constrained size, the system and method of the present invention will create a synopsis which will provide query responses which have substantially greater accuracy. Alternatively, where a particular accuracy/confidence interval is desired the synopsis generated by the system and method disclosed herein is substantially smaller than could be generated by random sampling, for example between five and one hundred times smaller. Thus, for example, less memory would be required in a query system to hold a synopsis created using the system and method of the present invention to provide query responses having the desired accuracy.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. The storage medium can be a non-transitory storage medium.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for generating a synopsis of a database table, the method comprising:
   receiving a first data sample from the database table, the first data sample being a subset of the database table;
   receiving a plurality of candidate functions for partitioning the first data sample;
   selecting a selected function from the plurality of candidate functions, wherein partitioning the first data sample with the selected function divides the first data sample into two data sample partitions, and wherein the selecting comprises selecting the selected function such that a variance of the two data sample partitions over candidate functions of the plurality of candidate functions other than the selected function is minimized;

re-partitioning the first data sample with the plurality of selected functions until a stopping condition is met;

generating a partition function using the plurality of selected functions;

receiving a second data sample from the database table, the second data sample being a subset of the database table;

partitioning the second data sample using the generated partition function;

generating a synopsis vector using the generated partition function in combination with a query history;

generating the synopsis of the database table using the second data sample partitioned with the generated partition function in combination with the synopsis vectors;

storing the synopsis in an associated memory device; and performing a Query on the synopsis stored in the associated memory device to provide an approximate answer to the query that is within a predetermined error bound relative to the query performed on the database table.

2. The method of claim 1, further comprising:
generating the plurality of candidate functions from a history of database queries used to interrogate the database table.

3. The method of claim 1, further comprising:
receiving an evaluation query set; and
determining the stopping condition using the evaluation query set.

4. The method of claim 1, further comprising:
providing, by the synopsis, an approximate response to an aggregation query which is within prescribed error bounds.

5. The method of claim 1, wherein generating the synopsis of the database table using the second data sample partitioned with the partition function in combination with the synopsis vector comprises:
reading a random block from the database table;
partitioning the random block into a plurality of pseudo-blocks using the partition function;
selecting randomly a selected pseudo-block of the plurality of pseudo-blocks; and
adding the selected pseudo-block to the synopsis if required by the synopsis vector.

6. The method of claim 5, further comprising:
discarding other pseudo-blocks of the plurality of pseudo-blocks if the selected pseudo-block is added to the synopsis.

7. The method of claim 5, further comprising:
selecting a different selected pseudo-blocks of the plurality of pseudo-blocks if the selected pseudo-block is not required by the synopsis vector.

8. The method of claim 5, further comprising:
repeating the reading, partitioning, selecting, and adding steps until said synopsis vector is satisfied and said synopsis is complete.

9. The method of claim 1, further comprising:
using the computer system to execute one or more aggregation queries on the synopsis.

10. A system comprising:
a computer system comprising:
a microprocessor, and
a memory device, the memory device storing a database table;

a partition function generator configured to generate a partition function by:
receiving a first data sample from the database table the first data sample being a subset of the database table;
receiving a plurality of candidate functions;
selecting a selected function from the plurality of candidate functions such that partitioning the first data sample with the selected function divides the first data sample into two data sample partitions having a lowest variance over the other candidate functions of the plurality of candidate functions; and
recursively selecting a plurality of selected functions until a stopping condition is met;

a synopsis vector calculator configured to receive a second data sample from the database table the second data sample being a subset of the database table, and the synopsis vector calculator being contoured to calculate a synopsis vector using the partition function generated by the partition function generator, a predicate query set and an error bound; and a synopsis constructor which samples data from the database table, partitions said data according to the partition function generated by the partition function generator and stores synopsis data in a synopsis in said memory device according to said synopsis vector, wherein the synopsis constructor is configured to read a random block from the database table, partition the random block into a plurality of pseudo-blocks using the partition function, randomly select a selected pseudo-block of the plurality of pseudo-blocks, and selectively add the randomly selected pseudo-block to the synopsis if required by the synopsis vector, wherein the system performs a query on the synopsis stored in said memory device to provide an approximate answer to the Query that is within a predetermined error bound relative to the query performed on the database table.

11. The system of claim 10, wherein the plurality of candidate functions comprise a history of database queries used to interrogate the database table.

12. The system of claim 10, wherein the partition function generator is further configured to receive an evaluation query set and use the evaluation query set to determine when to stop recursively selecting candidate functions for said partition function.

13. The system of claim 10, further comprising:
a query system wherein the query system is configured to receive aggregation queries, perform said aggregation queries on said synopsis and generate approximate answers to said aggregation queries within said error bound.

14. The system of claim 10, wherein the synopsis constructor is further configured to:
discard other pseudo-blocks of the plurality of pseudo-blocks if the selected pseudo-block is added to the synopsis.

15. The system of claim 10, wherein the synopsis constructor is further configured to:
select a different selected pseudo-blocks of the plurality of pseudo-blocks if the selected pseudo-block is not required by the synopsis vector.

16. The system of claim 10, wherein the synopsis constructor is further configured to:
repeat the reading, partitioning, selecting, and adding steps until said synopsis vector is satisfied and said synopsis is complete.

17. A non-transitory computer readable medium having instructions stored thereon for generating a synopsis of a database table, which instructions, when executed, cause a computer system to perform steps comprising:

receiving a first data sample from the database table, the first data sample being a subset of the database table;

receiving a plurality of candidate functions for partitioning the first data sample;

selecting a selected function from the plurality of candidate functions, wherein partitioning the first data sample with the selected function divides the first data sample into two data sample partitions, and wherein the selecting comprises selecting the selected function such that a variance of the two data sample partitions over the other candidate functions of the plurality of candidate functions is minimized;

re-partitioning the first data sample with the plurality of selected functions until a stopping condition is met;

generating a partition function using the plurality of selected functions;

receiving a second data sample from the database table, the second data sample being a subset of the database table;

partitioning the second data sample using the generated partition function;

generating a synopsis vector using the generated partition function in combination with a query history;

generating the synopsis of the database table using the second data sample partitioned with the generated partition function in combination with the synopsis vector, storing said synopsis in an associated memory device;

performing a query, on the synopsis stored in the associated memory device to provide an approximate answer to the query that is within a predetermined error bound relative to the query performed on the database table.

18. The non-transitory computer readable medium of claim 17, having instructions stored thereon, which, when executed, cause a computer system to perform further steps comprising:

providing a query system configured to receive aggregation queries, perform said aggregation queries on said synopsis in memory, and generate approximate answers to said aggregation queries within a specified error bound.

* * * * *